United States Patent
Baldeck

(10) Patent No.: US 7,682,222 B2
(45) Date of Patent: Mar. 23, 2010

(54) VARIABLE RATE METHOD OF MACHINING GEARS

(75) Inventor: Brian J. Baldeck, Mumford, NY (US)

(73) Assignee: The Gleason Works, Rochester, NY (US)

( * ) Notice: Subject to any disclaimer, the term of this patent is extended or adjusted under 35 U.S.C. 154(b) by 0 days.

(21) Appl. No.: 11/123,716

(22) Filed: May 6, 2005

(65) Prior Publication Data
US 2005/0266774 A1 Dec. 1, 2005

Related U.S. Application Data

(60) Provisional application No. 60/574,445, filed on May 26, 2004.

(51) Int. Cl.
*B24B 49/00* (2006.01)
(52) U.S. Cl. .............................. 451/11; 451/47; 451/147
(58) Field of Classification Search .................. 451/10, 451/11, 47, 48, 147, 149; 409/15
See application file for complete search history.

(56) References Cited

U.S. PATENT DOCUMENTS

| | | | |
|---|---|---|---|
| 2,942,389 A | 6/1960 | Praeg et al. | |
| 3,897,661 A * | 8/1975 | Inatomi et al. | 451/47 |
| 3,906,677 A * | 9/1975 | Gunter et al. | 451/5 |
| 3,909,990 A | 10/1975 | Tersch | |
| 4,163,346 A * | 8/1979 | Matson | 451/11 |
| 4,330,832 A * | 5/1982 | Kohzai et al. | 700/173 |
| 4,589,230 A * | 5/1986 | Yonemura et al. | 451/219 |
| 4,663,721 A | 5/1987 | Herscovici | |
| 4,697,387 A * | 10/1987 | Wirz | 451/209 |
| 4,850,760 A | 7/1989 | Okunishi et al. | |
| 5,191,739 A | 3/1993 | Kondo et al. | |
| 5,759,085 A | 6/1998 | Gugenheimer et al. | |
| 6,217,409 B1 * | 4/2001 | Stadtfeld et al. | 451/5 |
| 6,481,307 B1 | 11/2002 | Klingelnberg | |

FOREIGN PATENT DOCUMENTS

DE 3826029 C2 7/1990

* cited by examiner

*Primary Examiner*—Dung Van Nguyen
(74) *Attorney, Agent, or Firm*—Robert L. McDowell

(57) ABSTRACT

A method of machining gears or other toothed articles wherein the workpiece feed rate and/or the tool shifting is varied so as to produce an irregular surface pattern on tooth surfaces with a resulting reduction in mesh noise. The method is particularly applicable to grinding spur and/or helical gears with a grinding worm.

15 Claims, 6 Drawing Sheets

VARIABLE RATE METHOD OF MACHINING GEARS

This application claims the benefit of U.S. Provisional Patent Application No. 60/574,445 filed May 26, 2004.

FIELD OF THE INVENTION

The present invention is directed to a method of machining gears, particularly grinding of spur and helical gears, to enhance operating characteristics, such as the reduction of mesh noise.

BACKGROUND OF THE INVENTION

The reduction of mesh noise is an ongoing objective in the manufacture of gears of all types (e.g. spur, helical, bevel, hypoid, crown). It has been proposed to reduce the noise of gears running in mesh by including a honing process subsequent to heat treating as disclosed in U.S. Pat. No. 2,942,389 to Praeg et al. A further polishing step subsequent to honing for enhancing the surface finish is discussed in U.S. Pat. No. 3,909,990 to Tersch.

Finishing each member of a gear pair with a different finishing process to reduce gear noise is disclosed by U.S. Pat. No. 6,481,307 to Klingelnberg wherein one member is finished by honing and the other member is finished by grinding in an effort to create scratch-like machining marks or microstriations having different orientations on the tooth surfaces of respective gear pair members. German Patent No. DE 3826029 similarly discloses the avoidance of identical surface structures in an effort to reduce mesh noise by grinding one member of a gear pair and skiving the other member.

SUMMARY OF THE INVENTION

The present invention is directed to a method of machining gears or other toothed articles wherein the workpiece feed rate and/or the tool shifting is varied so as to produce an irregular surface pattern on tooth surfaces with a resulting reduction in mesh noise.

DETAILED DESCRIPTION OF THE PREFERRED EMBODIMENT

The present invention will now be discussed with reference to preferred embodiments which represent the invention by way of example only. The inventive process will be discussed in light of the preferred embodiment of grinding spur and helical gears with a grinding worm, although other machining methods may be utilized and other types of types of gears may be processed in accordance with the described aspects of the invention.

The process of machining gears, in particular grinding, has a tendency to produce a microscopic precise regular surface pattern on the gear tooth flanks, generally in the lengthwise direction, that under certain operating conditions is believed to be the cause of noise when such gears are run in mesh. The inventive method may be carried out on any machine capable of controlling the relative feeding of a tool (e.g. a threaded grinding wheel also known as a grinding worm) across the tooth surface of a workpiece and/or the relative shifting of a workpiece along the grinding wheel. Machines of this type are commercially available from The Gleason Works, Rochester, N.Y. as well as other suppliers. A machine of this type is illustrated in FIG. 1.

Figure 1:
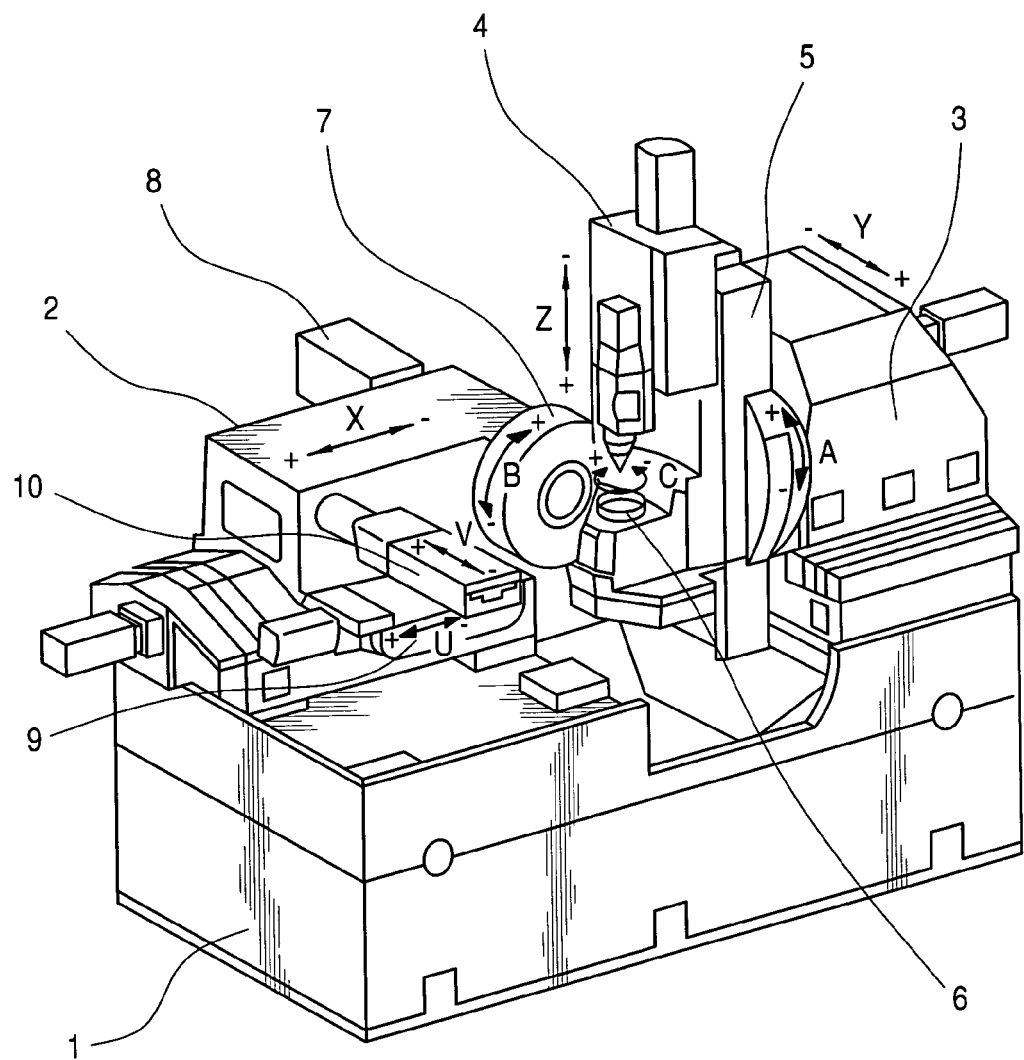
FIG. 1 schematically illustrates one type of grinding machine on which the inventive method may be carried out.

FIG. 1 represents a machine for grinding spur and helical gears and comprises a bed 1 on which a radial slide 2 displaceable in direction X and a tangential slide 3 displaceable in direction Y are arranged.

An axial slide 4 is displaceable in direction Z. The axial slide 4 is connected by its linear guides with a swivel slide 5. The axial slide 4 can be swiveled in direction A with the help of this swivel slide and can, because the swivel slide 5 is connected with the tangential slide 3, be displaced in direction Y.

The workpiece spindle 6 and its drive are housed inside of the axial slide 4. Workpiece spindle 6 holds a workpiece (not illustrated).

The radial slide 2 carries the tool spindle (not illustrated), the tool 7 embodied as a cylindrical grinding worm, and the tool drive 8. Radial slide 2 further carries the base for receiving a conventional dressing device. Such a dressing device is comprised, for example, of one or more diamond-coated dressings discs (not illustrated) with bearings and drives. Advantageously, the axis of the dressing disc(s) runs parallel to the rotational axis of the grinding worm 7.

The dressing device is displaceable in direction U (parallel to X) by a U slide 9 and in direction V (parallel to Y) by a V slide 10.

The machine of FIG. 1 includes a computer control system which governs the operation of the above components in accordance with instructions input to the machine controller, for example a computer numerical control (CNC) system such as the Fanuc model 160i-B or Siemens model 840D (not shown).

Figure 2:
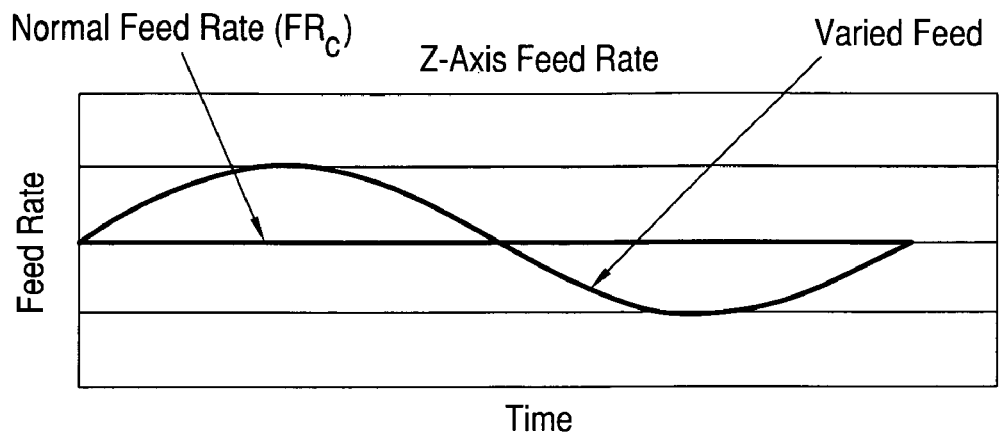
FIG. 2 is a graphical representation of a variable feed rate.

FIG. 2 illustrates an embodiment of the present invention wherein the feed rate of the grinding wheel relative to the workpiece (feed direction along the Z-axis in FIG. 1) is varied along the stroke length of the grinding wheel as it passes along the face width of the tooth surface. FIG. 2 illustrates a sinusoidal depiction of a feed rate along the stroke length wherein it can be seen that in comparison to a normal (constant) feed rate (horizontal line) for a given gear, the varied feed rate first increases at varying amounts and then decreases at varying amounts. The amplitude and frequency of the sine wave may vary along the stroke length. A single wave is shown in FIG. 2. The effect of such a feed rate is that the spacing of grinding micro scratches will be irregular along the face width of the tooth surface. It should be understood that the feed rate is not to be limited to being described by a sinusoidal wave but may be described by any line that varies in orientation along the stroke length with respect to the horizontal Normal Feed Rate line shown in FIG. 2.

Figure 3:
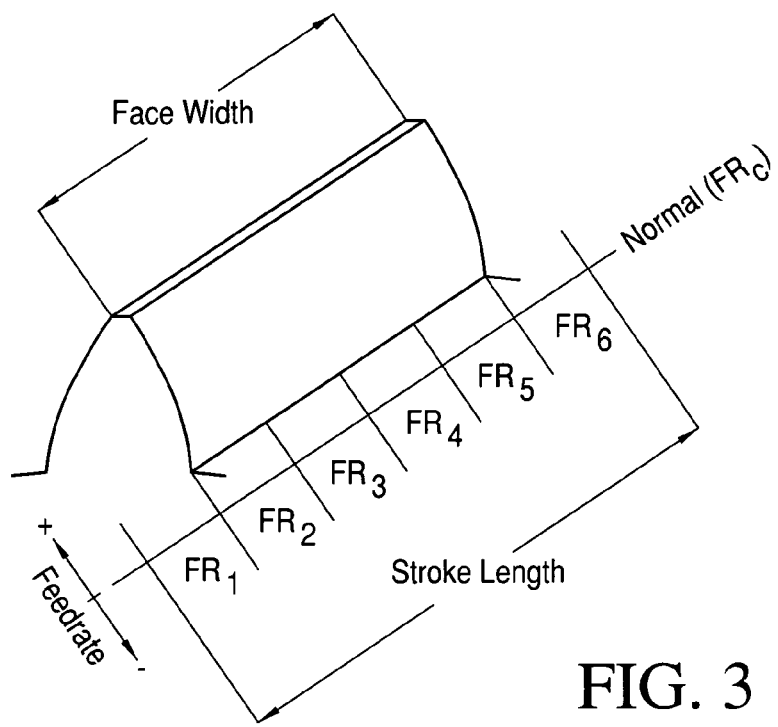
FIG. 3 shows a stroke length divided into a plurality of segments.
Figure 4:
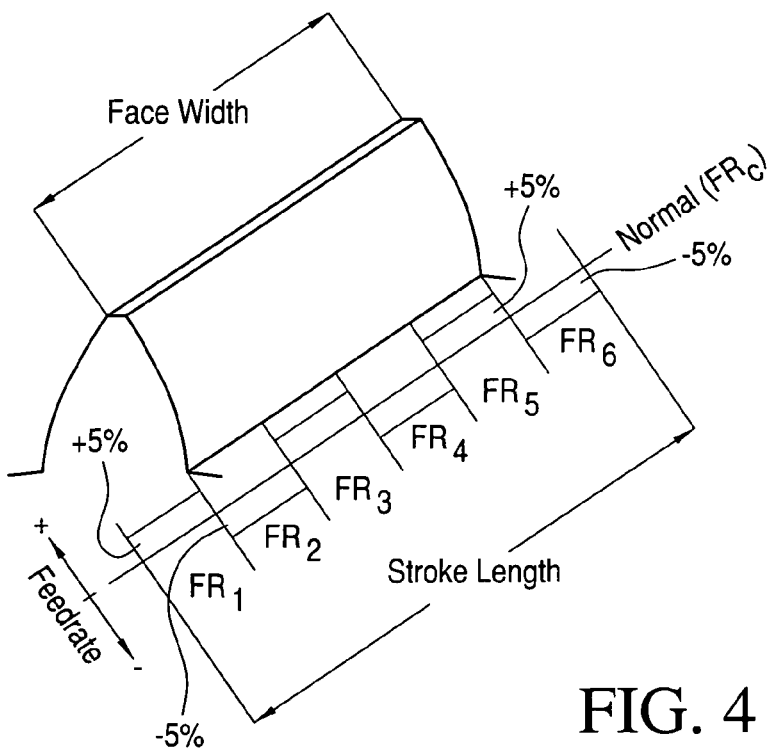
FIG. 4 illustrates an example of providing a different feed rate in successive segments of the grinding stroke length shown in FIG. 3.

Another embodiment of the present invention comprises dividing the stroke length of the grinding wheel relative to the face width into a predetermined number of segments (1 to n) and adjusting or varying the feed rate (FR) in each segment. For example, in FIG. 3, the stroke length has been divided into six segments ($FR_1$-$FR_6$). FIG. 4 illustrates a process wherein the feed rate in each segment ($FR_1$-$FR_6$) is varied by an amount different from that of the previous segment. For example, the feed rate of segment $FR_1$ may be +5% with respect to a normal constant feed rate $FR_c$ for the particular job. The feed rate in segment $FR_2$ may be adjusted to −5% of $FR_c$. The pattern may be repeated for the remaining segments. However, the adjusted feed rate need not follow a regular pattern of change. Instead, the feed rate may be increased or decreased from one segment to another by any percentage.

Figure 5:
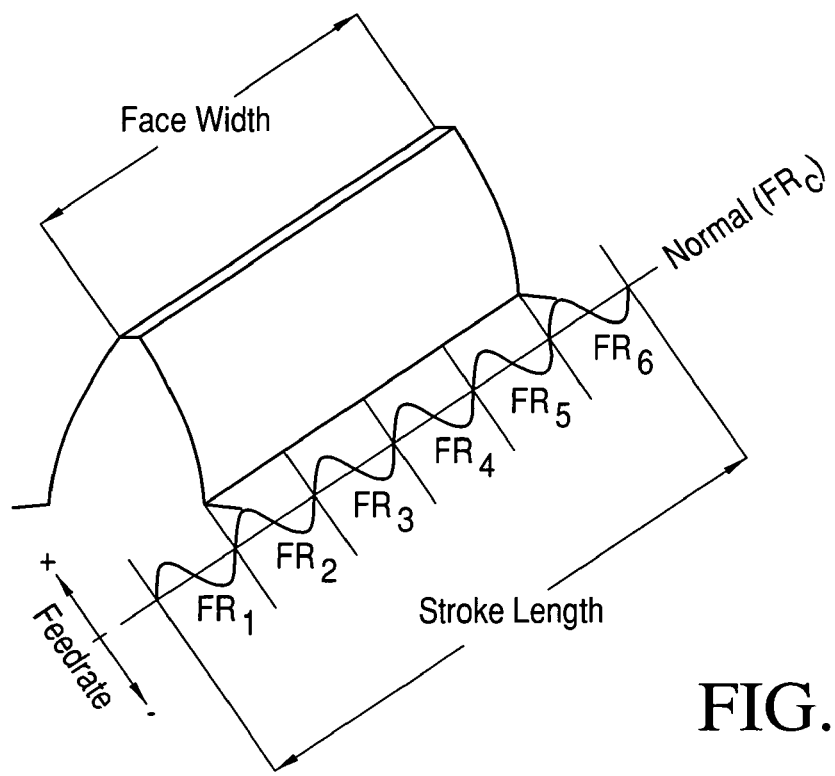
FIG. 5 illustrates varying the feed rate in each segment of FIG. 3 wherein the varying is described by a sine wave.

A more preferred embodiment is shown in FIG. 5 wherein the feed rate in each segment FR is described by a sine wave. Although sine waves having constant amplitudes are shown (e.g. ±5% with respect to $FR_c$ in each segment), the amplitudes of the sine wave in each segment need not be equal. As with the above discussion with respect to the entire tooth face width (FIG. 2), the feed rate in each segment is not to be limited to being described by a sinusoidal wave but may be described by any line that varies in orientation along the stroke length in each segment with respect to the horizontal Normal Feed Rate line $FR_c$.

Figure 6:
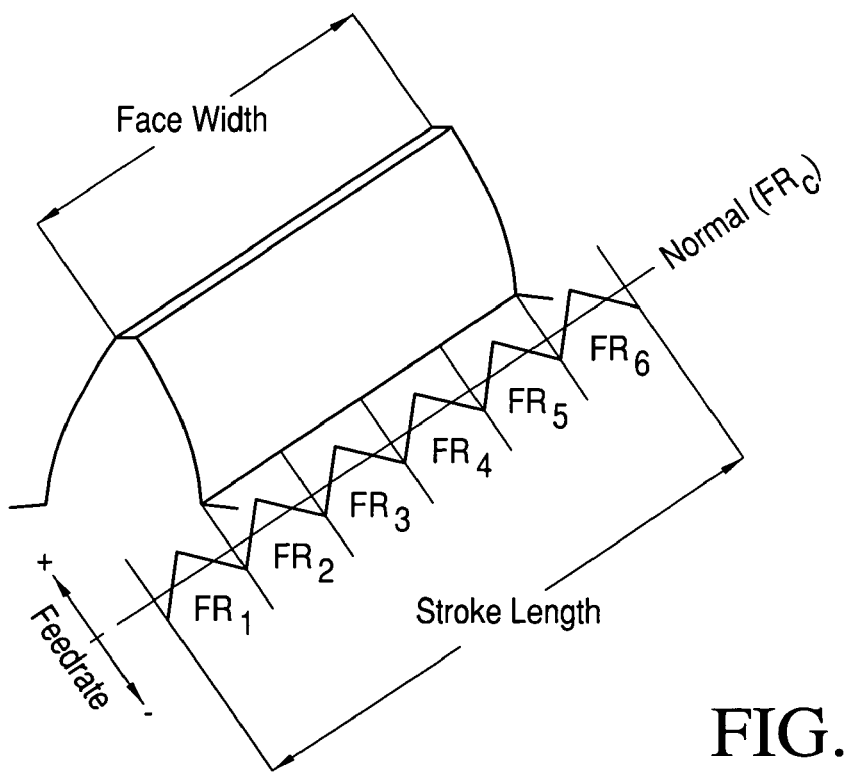
FIG. 6 illustrates varying the feed rate in each segment of FIG. 3 wherein the varying is described by a ramped function.
Figure 7:
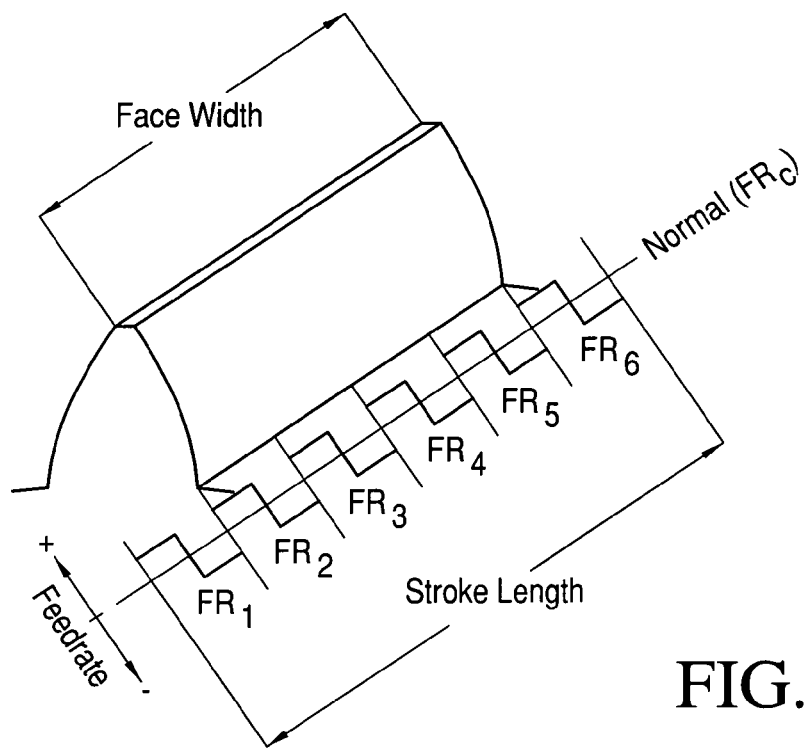
FIG. 7 illustrates varying the feed rate in each segment of FIG. 3 wherein the varying is described by a step function.
Figure 8:
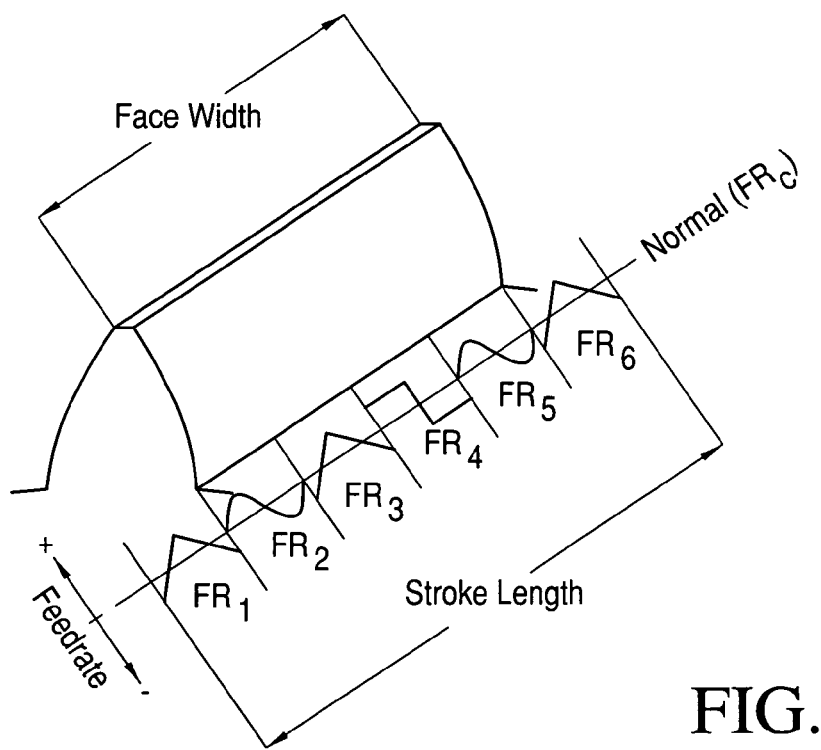
FIG. 8 illustrates varying the feed rate in each segment of FIG. 3 wherein the varying is described by a different function in each segment.

FIGS. 6, 7 and 8 illustrate additional examples of varying feed rates within each segment. FIG. 6 shows a feed rate within each segment described by a ramped function with a maximum/minimum of, for example, ±5% with respect to $FR_c$ in each segment. FIG. 7 illustrates a feed rate within each segment described by a step function (e.g. ±5% with respect to $FR_c$ in each segment) and FIG. 8 describes a process wherein a different type of varying feed rate is applied in each segment. In the illustrated example of FIG. 8, a step function, sine wave and ramped function are applied to respective successive segments and the pattern is repeated for additional segments. Also, a varied feed rate described by, for example, one or more of a step function, sine wave and ramped function may be applied across the entire tooth surface width as a whole, i.e. no segments are utilized.

Figure 9:
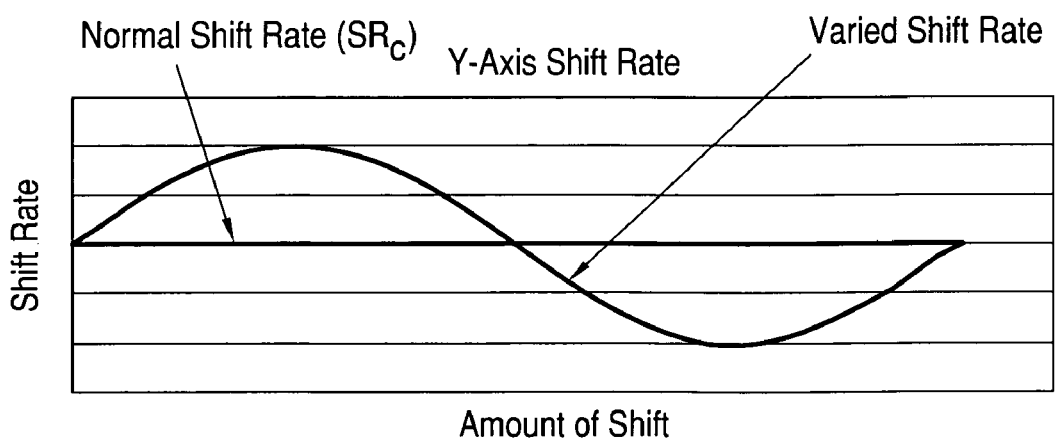
FIG. 9 shows a graphical representation of a variable shift rate.

The present invention also contemplates varying the shift rate of the grinding wheel (shift direction along the Y-axis in FIG. 1) relative to the workpiece during grinding of a workpiece. Shifting is utilized in order to expose a workpiece to new or lesser used portions of a grinding wheel thereby enabling higher metal removal rates that, consequently, allow for faster machine cycle times. During shifting, the rate of shifting can be adjusted in accordance with those changes discussed above with respect to varying the feed rate. FIG. 9 illustrates a sinusoidal depiction of a shift rate along a wheel shift portion wherein it can be seen that in comparison to a normal (constant) shift rate (horizontal line), the varied shift rate first increases at varying amounts and then decreases at varying amounts. The amplitude and frequency of the sine wave may vary along a designated wheel shift portion. A single wave is shown in FIG. 9. As described above, the effect of such a shift rate is that the spacing of grinding micro scratches will be irregular along the face width of the tooth surface. Again, it should be understood that the shift rate is not to be limited to being described by a sinusoidal wave but may be described by any line that varies in orientation along the total amount of shift with respect to the horizontal Normal Shift Rate line shown in FIG. 9.

Figure 10:
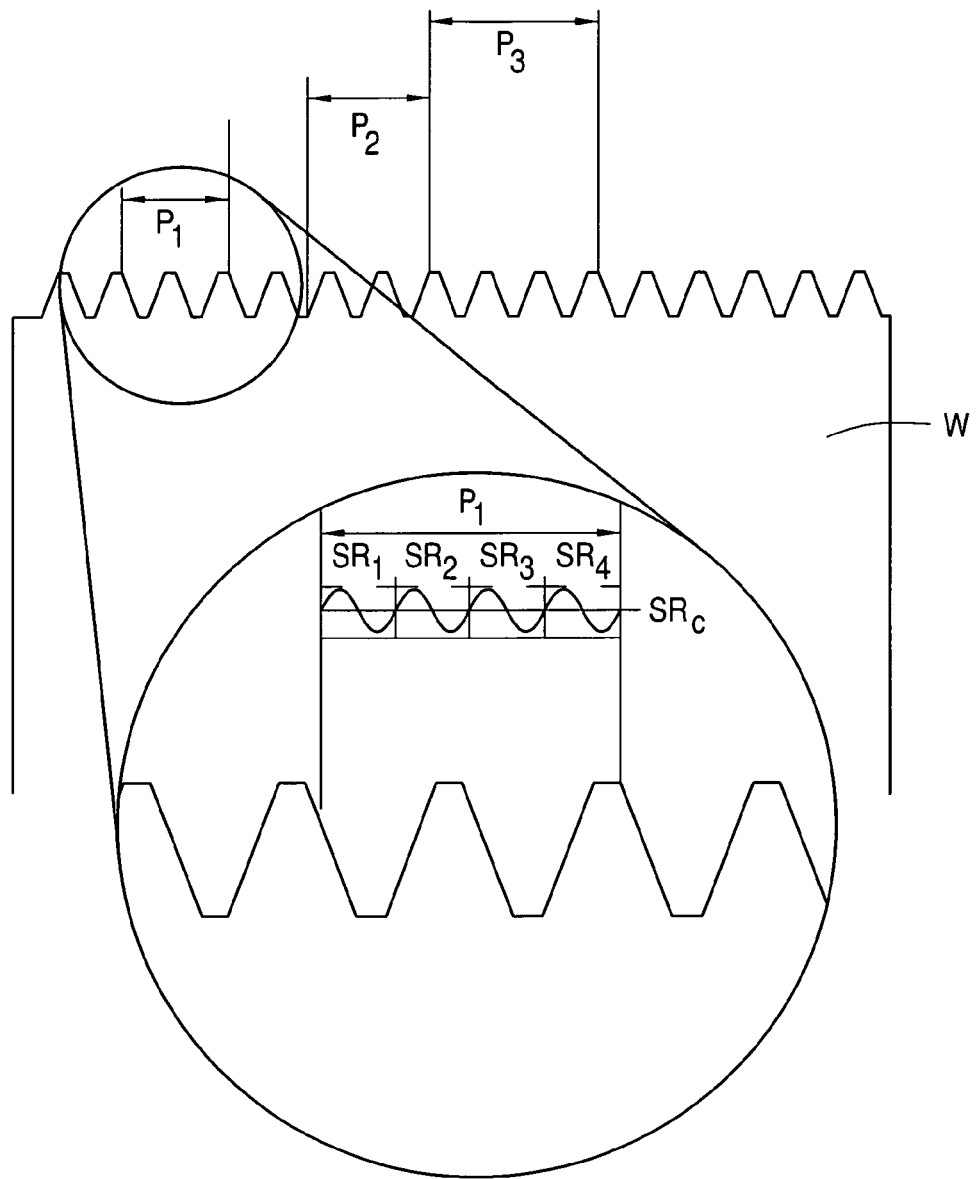
FIG. 10 illustrates an example of varying the shift rate in each segment of a grinding wheel shifting region.

Further embodiments of the present invention comprises dividing a shift portion length of the grinding wheel into a predetermined number of segments (1 to n) and adjusting or varying the shift rate (SR) in each segment. FIG. 10 shows a grinding wheel W wherein portions $P_1$, $P_2$ and $P_3$ have been identified as illustrating shifting regions of the grinding wheel. A shifting region is a portion of the wheel width along which shifting occurs while a workpiece is being ground. The shift rate within each portion may be varied. Looking at the exploded view of wheel portion $P_1$ it can be seen that $P_1$ has been divided into four segments (although any number of segments, 1 to n, are contemplated) and the shift rate within each segment ($SR_1$-$SR_4$) may be varied.

In a like manner with respect to FIGS. 4-8, the varied shift rate within particular segments may also be described by any line that varies in orientation along the length of the shift portion with respect to the horizontal Shift Rate line, $SR_c$, shown in FIG. 9 or 10. Preferably, for example, the shift rate may be described by a sine wave as illustrated in FIG. 10. Alternatively, the shift rate may be varied by an amount different from that of the previous segment. For example, the shift rate of segment $SR_1$ may be +5% with respect to a normal constant shift rate $SR_c$ for the particular gear. The shift rate in segment $FR_2$ may be adjusted to −5% of $SR_c$. The pattern may be repeated, if desired, for the remaining segments although no specific pattern need be followed. The shift rate may also be described by a ramped function or a step function. A combination of the above may also be utilized wherein a different type of varying feed rate is applied in each segment. Also, a varied shift rate described by, for example, one or more of a step function, sine wave and ramped function may be applied across the entire tooth surface width as a whole, i.e. no segments are utilized.

It should be understood that varying the feed rate and varying the shift rate may be utilize separately and in combination with one another. Also, for example, a varying feed rate may be described in a sinusoidal manner while a varying shift rate may be described by a varying percentage of a constant shift rate. The opposite is also contemplated. It is further intended that regardless of the manner by which varying occurs, the amount of time required to perform a machining process will not exceed that amount of time necessary to machine by the known constant feed rate and/or shift rate processes.

Although the present invention has been discussed with reference to the preferred embodiment of grinding spur and helical gears with a grinding worm, the invention is not limited thereto. The inventive method is applicable to other finishing processes for spur and helical gears such as hobbing (either pre-heat treatment or post-heat treatment) as well as hard skiving which utilizes a hob-type tool. The method of varying the feed rate is also applicable to grinding bevel, hypoid and crown gears such as by grinding with a flared-cup type grinding wheel or by a generated method utilizing a cup-shaped grinding wheel.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of grinding a toothed workpiece having at least one tooth surface wherein a threaded grinding wheel is moved relative to the tooth surface along a feed path extending in a direction along the tooth surface of the workpiece, said method comprising:

bringing the tooth surface and the threaded grinding wheel into contact with one another and moving the threaded grinding wheel relative to the workpiece in the feed path direction along the tooth surface at a varying feed rate whereby the spacing of grinding micro scratches will be irregular along the tooth surface, wherein the varying feed rate comprises:

defining a constant reference feed rate and defining a predetermined number of segments along the feed path, and moving the threaded grinding wheel through the number of tooth segments while providing a feed rate in each segment that varies from the reference feed rate.

2. The method of claim 1 wherein the threaded grinding wheel is moved relative to the tooth surface along the feed path over a predetermined stroke length and wherein a constant reference feed rate along the stroke length is graphically represented by a horizontal reference line, the varying feed rate being described by a line that varies in orientation along the stroke length with respect to the horizontal reference line.

3. The method of claim 1 wherein the varying feed rate is described by at least one of a sine wave, a ramped function and a stepped function.

4. The method of claim 1 wherein the threaded grinding wheel is moved relative to the tooth surface along the feed path over a predetermined stroke length and wherein a constant reference feed rate along the stroke length is graphically represented by a horizontal reference line, the varying feed rate in each segment being described by a line that varies in orientation along the stroke length with respect to the horizontal reference line.

5. The method of claim 1 wherein the varying feed rate in each segment is described by at least one of a sine wave, a ramped function and a stepped function.

6. The method of claim 1 wherein the feed rate in each segment differs from the reference feed rate with feed rates in successive segments being different from one another.

7. The method of claim 1 further comprising shifting the workpiece relatively along a predetermined lengthwise portion of the threaded grinding wheel during machining, the shifting occurring at a varying shift rate.

8. The method of claim 7 wherein the workpiece is shifted relative to the threaded grinding wheel along the predetermined lengthwise portion of the threaded grinding wheel and wherein a constant reference shift rate along the lengthwise portion is graphically represented by a horizontal reference line, the varying shift rate being described by a line that varies in orientation along the lengthwise portion with respect to the horizontal reference line.

9. The method of claim 8 wherein the varying shift rate is described by at least one of a sine wave, a ramped function and a stepped function.

10. The method of claim 7 wherein the varying shift rate comprises:

defining a constant reference shift rate and defining a predetermined number of segments along the predetermined lengthwise portion, and shifting the workpiece relative to the threaded grinding wheel through the number of tooth segments while providing a shift rate in each segment that varies from the constant reference shift rate.

11. The method of claim 10 wherein the workpiece is shifted relative to the threaded grinding wheel over the predetermined lengthwise portion and wherein a constant reference shift rate along the predetermined portion is graphically represented by a horizontal reference line, the varying shift rate in each segment being described by a line that varies in orientation along the lengthwise portion with respect to the horizontal reference line.

12. The method of claim 10 wherein the varying shift rate in each segment is described by at least one of a sine wave, a ramped function and a stepped function.

13. The method of claim 10 wherein the shift rate in each segment differs from the reference shift rate with shift rates in successive segments being different from one another.

14. The method of claim 7 wherein said workpiece comprises spur or helical gears.

15. The method of claim 1 wherein said workpiece comprises spur or helical gears.

* * * * *